United States Patent
Kobayashi

[11] Patent Number: 5,646,916
[45] Date of Patent: Jul. 8, 1997

[54] TRACK-LEAD-IN CONTROL DEVICE FOR OPTICAL HEAD

[75] Inventor: Hajime Kobayashi, Tokyo, Japan

[73] Assignee: NEC Corporation, Japan

[21] Appl. No.: 531,223

[22] Filed: Sep. 19, 1995

[30] Foreign Application Priority Data

Sep. 21, 1994 [JP] Japan .................................. 6-226400

[51] Int. Cl.$^6$ .......................................................... G11B 7/00
[52] U.S. Cl. ............................................ 369/32; 369/44.28
[58] Field of Search .............................. 369/44.27, 44.28, 369/44.29, 32

[56] References Cited

U.S. PATENT DOCUMENTS

| | | | |
|---|---|---|---|
| 4,731,771 | 3/1988 | Maeda et al. | 369/44.28 |
| 5,191,566 | 3/1993 | Yamaguchi et al. | 369/44.28 |
| 5,216,651 | 6/1993 | Hwang | 369/44.28 |
| 5,327,407 | 7/1994 | Suzuki et al. | 369/44.28 |
| 5,459,705 | 10/1995 | Matoba et al. | 369/44.28 |

FOREIGN PATENT DOCUMENTS 61-194645  8/1986  Japan .
3-160626  7/1991  Japan .

*Primary Examiner*—Nabil Hindi
*Attorney, Agent, or Firm*—Ostrolenk, Faber, Gerb & Soffen, LLP

[57] ABSTRACT

A photosensor receives laser light reflected from an optical disk with a two-segmented photodetecting surface. A relative speed detecting section binarizes a difference signal of output signals of the photosensor, and detects time points when the laser light is located at the centers of tracks and grooves of the optical disk. When a detected interval is longer than a preset value, the relative speed detecting section outputs a speed detection pulse having a preset pulse width. A track detecting section binarizes a sum signal of the output signals of the photosensor, detects time points when the laser light is located at a track edge, and outputs a track detection pulse having a preset pulse width. A loop switch turns on/off a tracking servo loop in accordance with a tracking start signal that is generated by an AND circuit and a D flip-flop.

4 Claims, 6 Drawing Sheets

FIG. 1

DISK ROTATION SPEED    4500 rpm
DISK ECCENTRICITY        90 μm
TRACK PITCH               1.2 μm

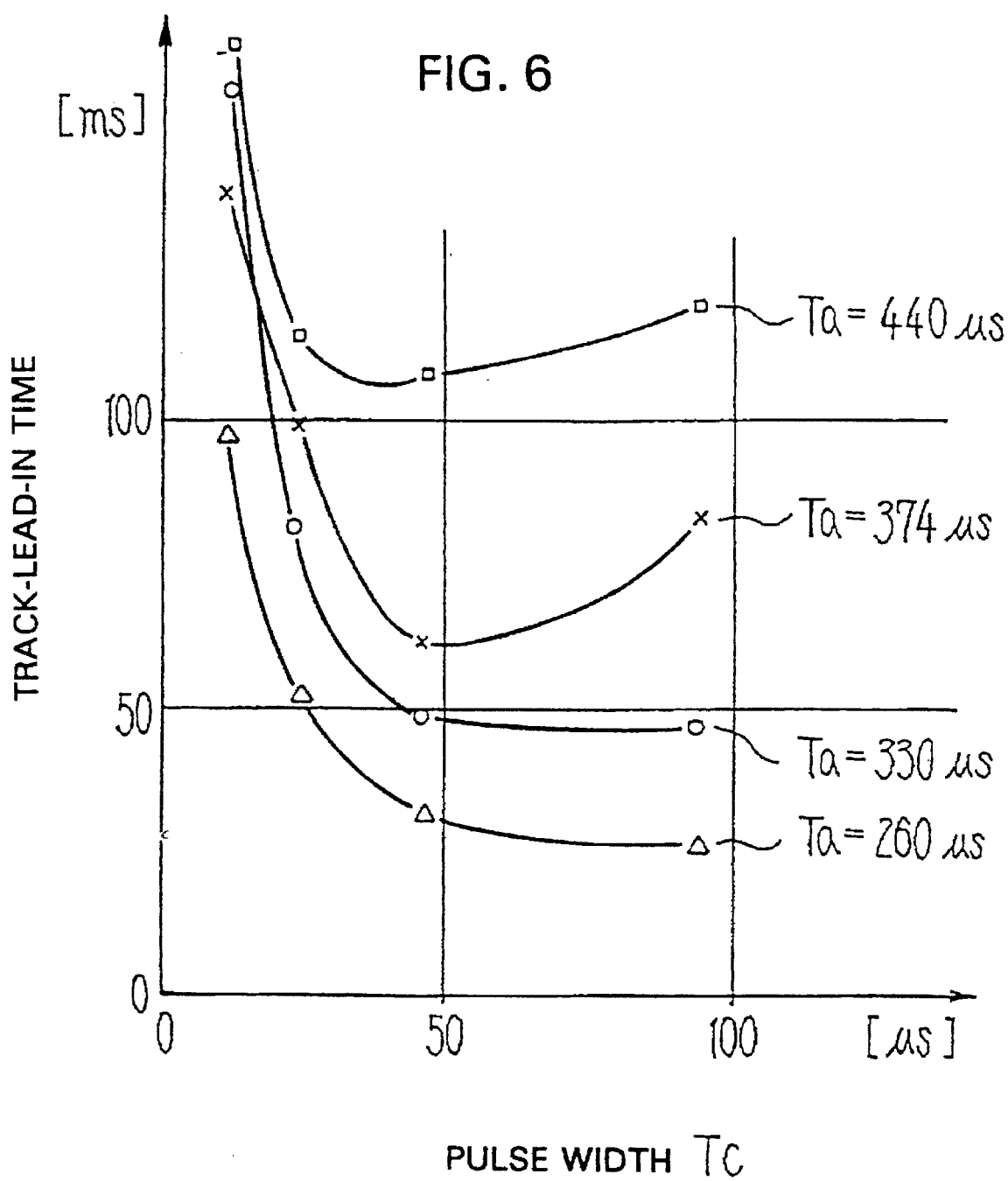

TRACK-LEAD-IN CONTROL DEVICE FOR OPTICAL HEAD

BACKGROUND OF THE INVENTION

The present invention relates to an optical head tracking control device and, more specifically, to an optical head tracking control device which enables a stable track-lead-in operation even with an optical disk rotating at high speed and at the occurrence of a track deviation due to disk eccentricity.

A conventional tracking control device which enables a stable track-lead-in operation even at the occurrence of a track deviation due to eccentricity of an optical disk or some other factor is disclosed in Japanese Unexamined Patent Publication No. Sho 61-194645 (1986), for instance. In this device, the speed of a light spot when it traverses a track is detected based on a signal indicating a track deviation, and a pulse signal indicating that the light spot has just passed the track center is generated based on the signal indicating the track deviation and a signal indicating the quantity of reflection light from the optical disk. A track-head-in operation is started by closing the tracking servo loop when a light spot has just passed a track center at a track-passing speed lower than a predetermined speed.

However, the data transfer rate has increased in the recent video disk field, for instance. 140 Mbps is required for digital-recording a non-compressed PAL video signal. To write this signal onto a disk at a current recording density, the disk needs to be rotated at a speed as high as about 4,500 rpm, which is more than two times higher than the conventional speed. On the other hand, to elongate the recording time, it is also required to reduce the track pitch of a disk. For example, while the track pitch of the conventional compact disk (CD) is 1.6 μm, employment of a 1.2 μm track pitch is now being considered in the video disk field.

In the conventional tracking control device disclosed in the above-mentioned publication, the tracking servo loop is closed when a light spot has just passed a track center at a track-passing speed lower than a predetermined speed. However, under the exacting conditions, such as a disc rotation speed of 4,500 rpm and a track pitch of 1.2 μm, which recent video disks are required to satisfy, it is difficult for the tracking servo control to effect, in a stable manner, a track-lead-in operation even if it is started at a time instant when a track center is detected. This is due to the fact that since the lead-in start point is the track center, only half of the overall track width is available after the start of the lead-in operation. In addition, currently, there exist optical disks having an eccentricity of several hundred micrometers. A track-lead-in operation is more likely to fail with a disk having such a large eccentricity.

SUMMARY OF THE INVENTION

An object of the present invention is to provide an optical head tracking control device which enables a stable track-lead-in operation even under exacting conditions such as a disk rotation speed of 4,500 rpm, a disk eccentricity of 90 μm, and a track pitch of 1.2 μm.

According to the invention, there is provided an optical head tracking control device comprising a switch for turning on/off a tracking servo loop in accordance with a tracking start signal; a photosensor provided in an optical head, for receiving laser light reflected from tracks of an optical disk; relative speed detecting means for detecting, based on a photodetection output signal of the photosensor, a relative speed at which the laser light traverses the tracks, and for generating a speed detection pulse having a preset pulse width at a time point when the detected relative speed becomes lower than a preset value; track detecting means for detecting, based on the photodetection output signal of the photosensor, a time point when the laser light is located at a track edge, and generating a track detection pulse having a predetermined pulse width; and tracking start signal generating means for generating the tracking start signal based on an ANDed value of the speed detection pulse and the track detection pulse.

With the above constitution, the photosensor has a photodetecting surface that is divided into at least two segments along the track direction. The track detecting means comprises a filter for extracting an AC component of an addition signal of the photodetection output signals of the photodetecting surface, a binarizing circuit for generating a binary signal by binarizing an output signal of the filter, and a monostable multivibrator for outputting a track detection pulse having a preset pulse width when detecting a fall of a pulse of the binary signal.

BRIEF DESCRIPTION OF THE DRAWINGS

FIG. 6 shows an example of data obtained by measuring a relationship between a pulse width Tc (see FIG. 2) and a track-lead-in time by using the optical disk apparatus.

DESCRIPTION OF THE PREFERRED EMBODIMENTS

The present invention will be hereinafter described with reference to the accompanying drawings.

Figure 1:
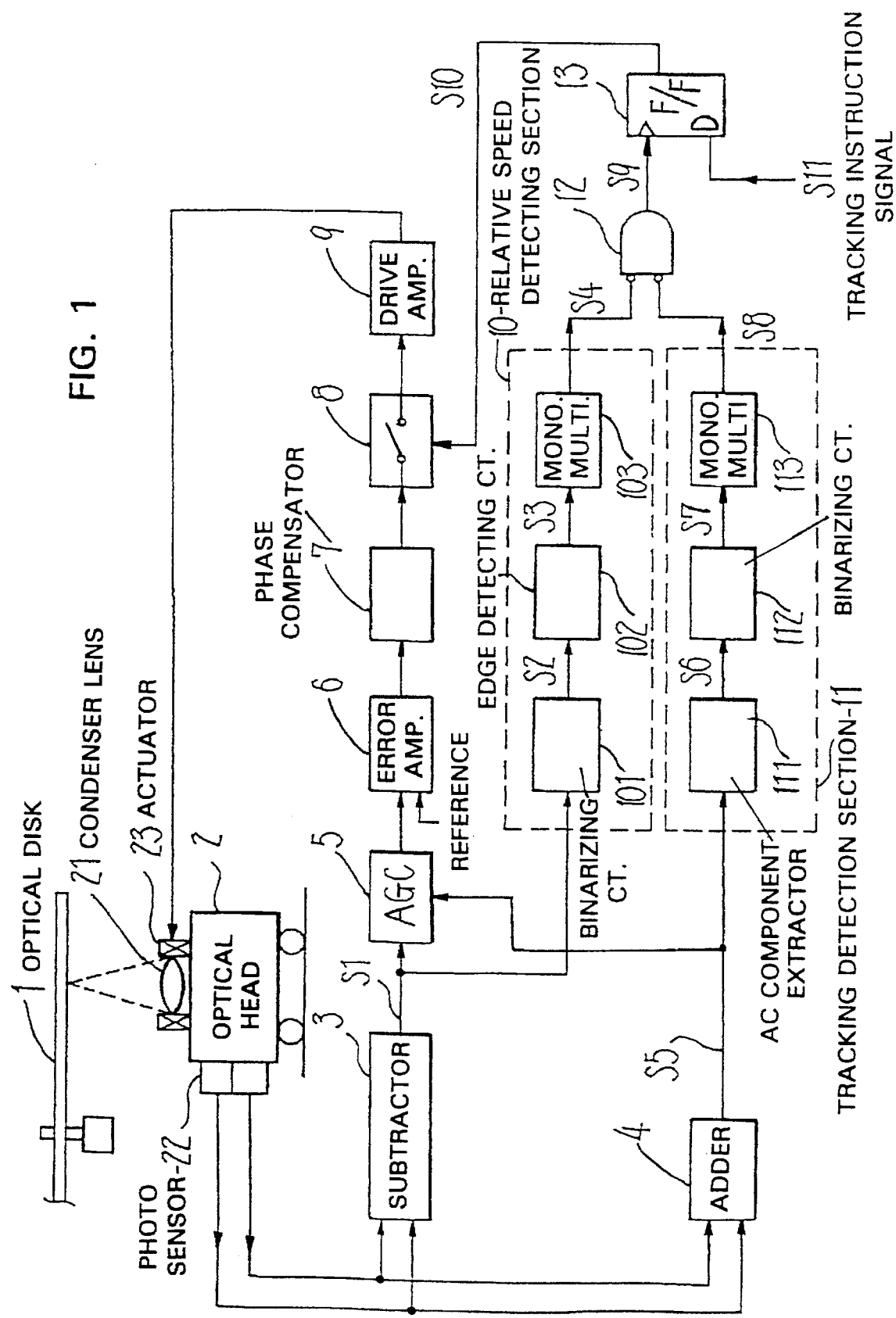
FIG. 1 is a block diagram showing an embodiment of the present invention.

FIG. 1 is a block diagram showing an embodiment of the invention. An optical head 2 applies laser light to an optical disk 1 while condensing it by means of a condenser lens 21, and detects reflection light from the optical disk 1 by receiving it with the condenser lens 21 and guiding it to a photosensor 22. The photosensor 22 has a photodetecting surface that is divided into two segments along the track direction of the optical disk 1. The condenser lens 21 is movably supported by an actuator 23.

A subtracting section 3 receives two photodetection output signals from the photosensor 22, and generates and outputs a difference signal S1 that represents the difference of the photodetection output signals. An adding section 4 generates and outputs a sum signal S5 that represents the sum of the photodetection output signals. The sum signal S5 is proportional to the reflectance of the optical disk 1. An AGC section 5 controls the level of the difference signal S1 in accordance with the sum signal S5 to absorb a variation of reflectance among optical disks, to thereby maintain a constant loop gain.

An error amplifier 6 generates a tracking error signal by comparing the output of the AGC section 5 with a reference input. A phase compensating section 7 gives a proper frequency-phase characteristic to the tracking error signal. A loop switch 8, which operates in accordance with a tracking start signal S10 that is sent from a D flip-flop 13, switches on/off the tracking servo loop. A drive amplifier 9 drives an actuator 23 of the optical head 2 based on the tracking error signal so that the laser light follows the tracks.

Figure 3:
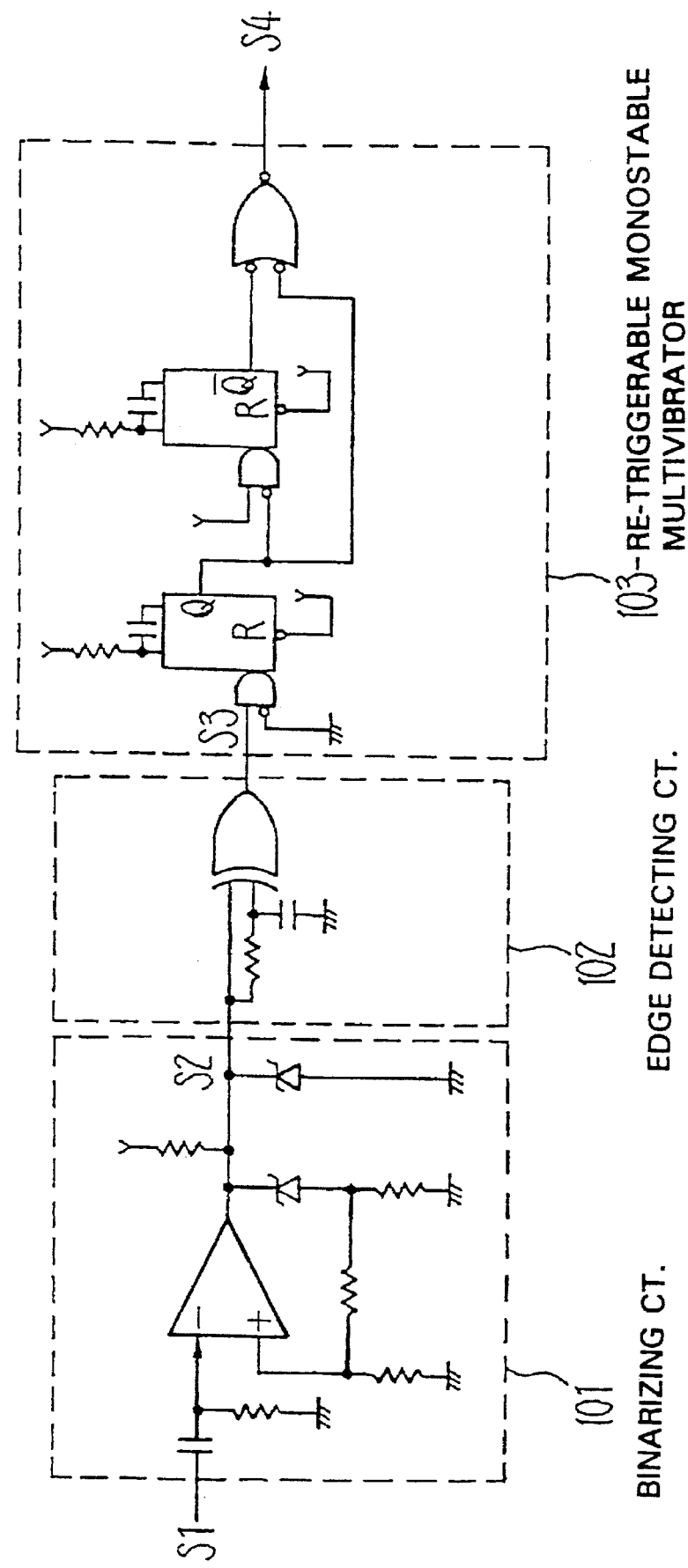
FIG. 3 is a circuit diagram showing an example of a relative speed detecting section shown in FIG. 1.

A relative speed detecting section 10 monitors a relative speed in the disk radial direction between the laser light and the track based on the difference signal S1, and outputs a speed detection pulse S4 when the relative speed becomes smaller than a predetermined value. The relative speed detecting section 10 consists of a binarizing circuit 101, an edge detecting circuit 102 and a re-triggerable monostable multivibrator 103. FIG. 3 shows an example of a detailed circuit configuration of the relative speed detecting section 10. Descriptions of the respective circuits shown in FIG. 3 are omitted here because they are known circuits.

A description will now be made of the operation of the relative speed detecting section 10. Assume that the difference signal S1 has a waveform shown in FIG. 2(a). In such a case, the binarizing circuit 101 outputs a binary signal S2 shown in FIG. 2(b) by binarizing the difference signal S1. The edge detecting circuit 102 outputs pulse S3 shown in FIG. 2(c) which represents the centers of tracks and grooves, by generating a pulse every time the polarity of the binary signal S2 is reversed. Further, the re-triggerable monostable multivibrator 103 outputs a speed detection pulse S4 having a pulse width Tb shown in FIG. 2(d) at a time point when the interval between the pulses S3 becomes longer than a preset value Ta. Ta and Tb are set, based on experimental data, at values that allow a stable and quick track-lead-in operation.

Figure 4:
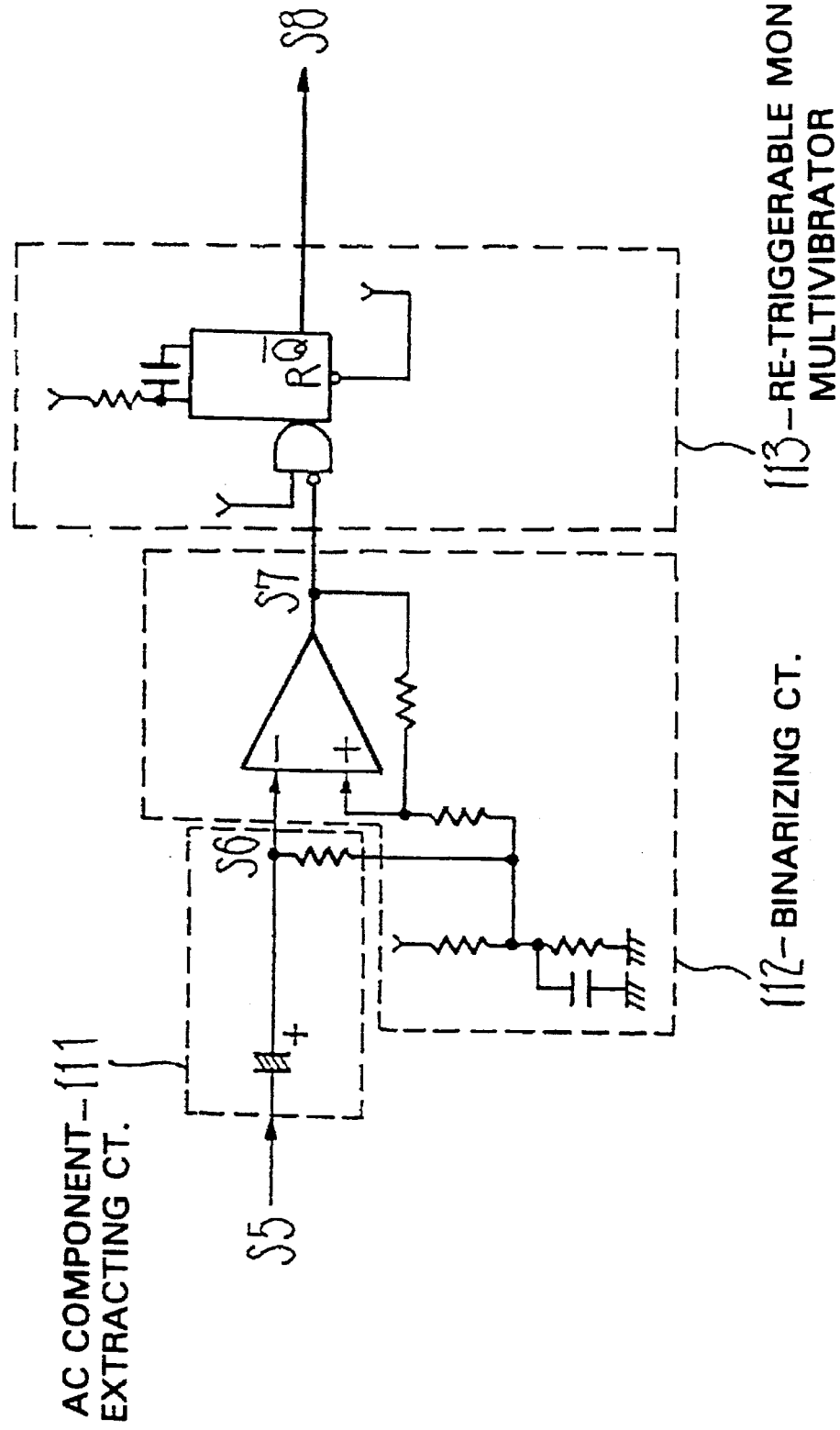
FIG. 4 is a circuit diagram showing an example of a track detecting section shown in FIG. 1.

A track detecting section 11 detects, based on the sum signal S5, a time point when the laser light is located at a track edge, and outputs a track detection pulse S8. The track detecting section 11 consists of an AC component extracting circuit 111, a binarizing circuit 112 and a re-triggerable monostable multivibrator 113. FIG. 4 shows an example of a detailed circuit configuration of the track detecting section 11. Descriptions of the respective circuits shown in FIG. 4 are omitted here because they are known circuits.

A description will now be made of the operation of the track detecting section 11. The AC component extracting circuit 111, which consists of a capacitor and a resistor and is a highpass filter having a cutoff frequency of 6 Hz, extracts an AC component of the sum signal S5, to thereby detect tracks and grooves while discriminating between those in a stable manner without being influenced by a variation of reflectance of the optical disk 1 and other variations. Assume that a sum signal S6 at the output of the AC component extracting circuit 111 has a waveform shown in FIG. 2(e). In such a case, the binarizing circuit 112 binarizes the sum signal S6 and outputs a binary signal S7 shown in FIG. 2(f). Further, the re-triggerable monostable multivibrator 113 detects a time instant when the binary signal S7 falls, i.e., when the laser light has just located at a track edge as it moves from a groove region to a track region, and outputs a track detection pulse S8 having a preset pulse width Tc shown in FIG. 2(g).

Figure 2:
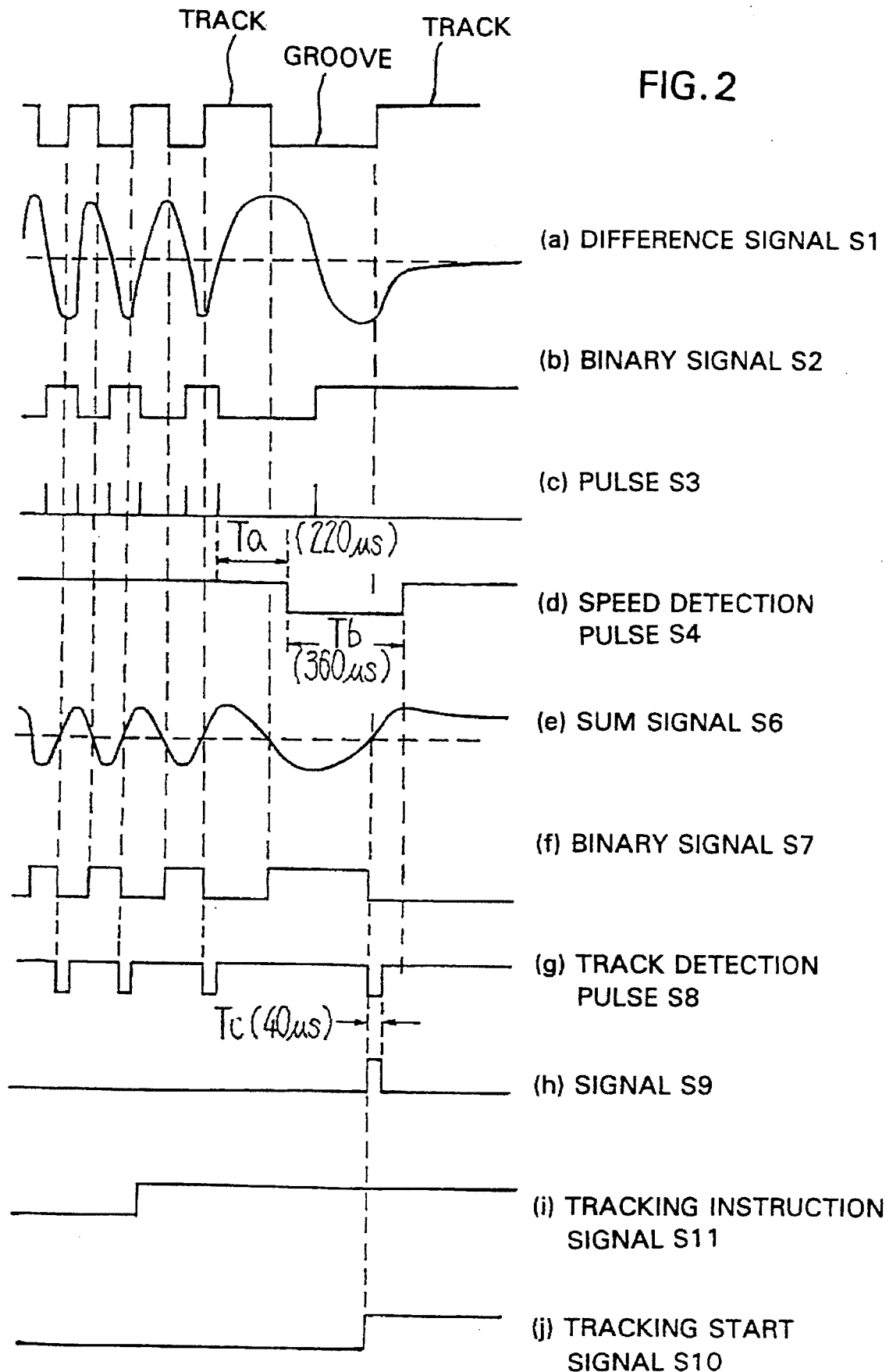
FIG. 2 is a timing chart of respective signals shown in FIG. 1.

The speed detection pulse S4 and the track detection pulse S8 that have been generated in the above manner are input to an AND circuit 12, which outputs a signal S9 that is the AND of the pulses S4 and S8 as shown in FIG. 2(h). That is, the output signal S9 of the AND circuit 12 indicates that both of the relative speed and the position of the laser light are suitable for a track-lead-in operation.

Receiving the signal S9 (see FIG. 2(h)) at a clock input terminal and an externally supplied tracking instruction signal S11 (see FIG. 2(i)) at a D input terminal, the D flip-flop 13 outputs a tracking start signal S10 shown in FIG. 2(j). That is, under the condition that the tracking instruction signal S11 is at the "H" level, the D flip-flop 13 causes the tracking start signal S10 to rise, to thereby turn on the loop switch 8 at a time instant when the signal S9 rises.

Next, a description will be made of how to set the values of Ta, Tb and Tc.

Figure 5:
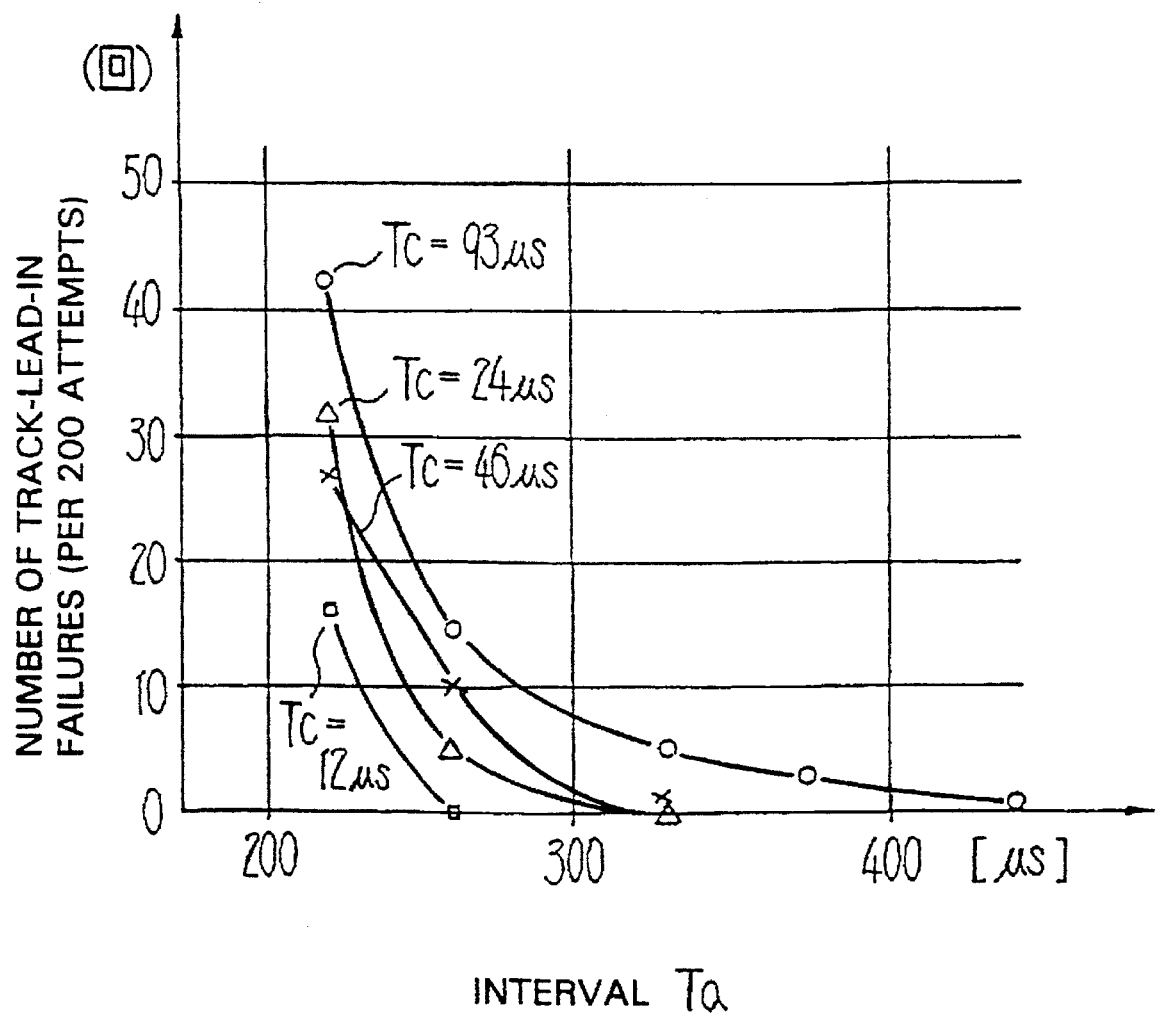
FIG. 5 shows an example of data obtained by measuring a relationship between an interval Ta (see FIG. 2) and the number of track-lead-in failures by using an optical disk apparatus.

FIGS. 5 and 6 show the results of measurements performed by using an optical disk apparatus for an optical disk with a disk rotation speed 4,500 rpm, a disk eccentricity 90 µm, and a track pitch 1.2 µm. More specifically, FIG. 5 shows a relationship between the track-groove interval Ta in generating the speed detection pulse S4 and the number of track-lead-in failures (per 200 attempts) where the pulse width Tc of the track detection pulse S8 is used as a parameter. It is apparent from FIG. 5 that the number of track-lead-in failures can be reduced by shortening the width Tc of the track detection pulse S8 and elongating the track-groove interval Ta to reduce the relative speed.

On the other hand, FIG. 6 shows a relationship between the width Tc of the track detection pulse S8 and the track-lead-in time where the pulse interval Ta is used as a parameter. It is seen from FIG. 6 that the track-lead-in time increases steeply as the width Tc of the track detection pulse S8 is decreased from 30 µs. Therefore, where an optical disk with a disk eccentricity 90 µm and a track pitch 1.2 µm is used and the disk rotation speed is set at 4,500 rpm in this optical disk apparatus, the optimum conditions in consideration of the number of track-lead-in failures and the track-lead-in time are such that the pulse interval Ta in generating the speed detection pulse S4 is 220 µs and the width Tc of the track detection pulse S8 is 40 µs. To positively generate the signal S9 based on the track detection pulse S8, the width Tb of the speed detection pulse S4 is set at 360 µs, which is 9 times the width 40 µs of the track detection pulse S8.

With the above configuration, a stable track-lead-in operation can be attained even under the exacting conditions of a disk rotation speed 4,500 rpm, a disk eccentricity 90 µm, and a track pitch 1.2 µm.

As described above, according to the invention, the track detection pulse having a preset pulse width is generated by detecting a time point when the laser light is located at a track edge based on the photodetection output signals of the photosensor that receives reflection light from the tracks. Further, a time point when the relative speed in the disk radial direction between the laser light and the tracks becomes lower than a preset value is detected based on the photodetection output signals of the photosensor. When both of the relative speed and the position of the laser light become the preset values, the loop switch is turned on to start a track-lead-in operation. By presetting the pulse widths at optimum values based on measurement data obtained by use of an actual optical disk apparatus, a stable track-lead-in operation can be attained even under exacting conditions such as a combination of a high disk rotation speed of 4,500 rpm, a disk eccentricity of about 90 µm, and a track pitch of 1.2 µm.

What is claimed is:

1. An optical head tracking control device comprising:
   a switch for turning on and off a tracking servo loop in accordance with a tracking start signal;
   a photosensor provided in an optical head, for receiving laser light reflected from tracks of an optical disk;
   speed detecting means for detecting, based on a photodetection output signal of the photosensor, a speed at which the laser light traverses the tracks and for generating a speed detection pulse having a preset pulse width;

track edge detecting means for detecting, based on the photodetection output signal of the photosensor, a time point when the laser light is located at a track edge and for generating a track edge detection pulse having a predetermined pulse width; and tracking start signal generating means for generating the tracking start signal based on the speed detection pulse and the track edge detection pulse.

2. The optical head tracking control device of claim 1, wherein said speed detecting means generates the speed detection pulse when the detected speed becomes lower than preset value.

3. The optical head tracking control device of claim 1, wherein the photosensor has a photodetecting surface that is divided into at least two segments along a track direction, said track edge detecting means producing the track edge detecting pulse based on the summation of output signals from the at least two segments.

4. The optical head tracking control device of claim 3, wherein said track detecting means comprises a filter for extracting an AC component from the summation of output signals, a binarizing circuit for generating a binary signal from an output signal of the filter, and a monostable multivibrator for outputting the track edge detection pulse having the predetermined pulse width corresponding to a falling edge of the binary signal.

* * * * *